United States Patent [19]
Amemiya

[11] Patent Number: 5,636,058
[45] Date of Patent: Jun. 3, 1997

[54] MICROSCOPE OBJECTIVE LENS AND MICROSCOPE USING THE SAME

[75] Inventor: Noboru Amemiya, Fujisawa, Japan

[73] Assignee: Nikon Corporation, Japan

[21] Appl. No.: 443,226

[22] Filed: May 17, 1995

[30] Foreign Application Priority Data

Nov. 9, 1994 [JP] Japan .................................. 6-274614
Jan. 6, 1995 [JP] Japan .................................. 7-000871

[51] Int. Cl.$^6$ .................................................. G02B 21/02
[52] U.S. Cl. ........................................... 359/656; 359/657
[58] Field of Search .................................... 359/656, 657, 359/658, 659, 660, 661

[56] References Cited

FOREIGN PATENT DOCUMENTS 60-209715A 10/1985 Japan .
5-127088A  5/1993 Japan .

*Primary Examiner*—Scott J. Sugarman
*Assistant Examiner*—Jordan M. Schwartz
*Attorney, Agent, or Firm*—Pennie & Edmonds

[57] ABSTRACT

This invention has as its object to eliminate flare light as a cause of low contrast. A microscope objective lens has, in the following order from the object side, a front group having positive refracting power to convert a beam from an object into a convergent beam, and having a positive meniscus lens element with a concave surface facing the object side, and a cemented lens component disposed at the image side of the positive meniscus lens, and a rear group having negative refracting power, constituted by cementing a negative lens element and a positive lens element, and disposed at the image side of the front group. A last cemented lens component, disposed nearest to the image side, of the cemented lens component in the front group satisfies:

$$|R_1|/f > 100 \quad (1)$$

$$|R_2|/f > 20 \quad (2)$$

where $R_1$ is the radius of curvature of a lens surface on the object side of the last cemented lens component, $R_2$ is the radius of curvature of a lens surface on the image side of the last cemented lens component, and f is the focal length of the microscope objective lens.

10 Claims, 14 Drawing Sheets

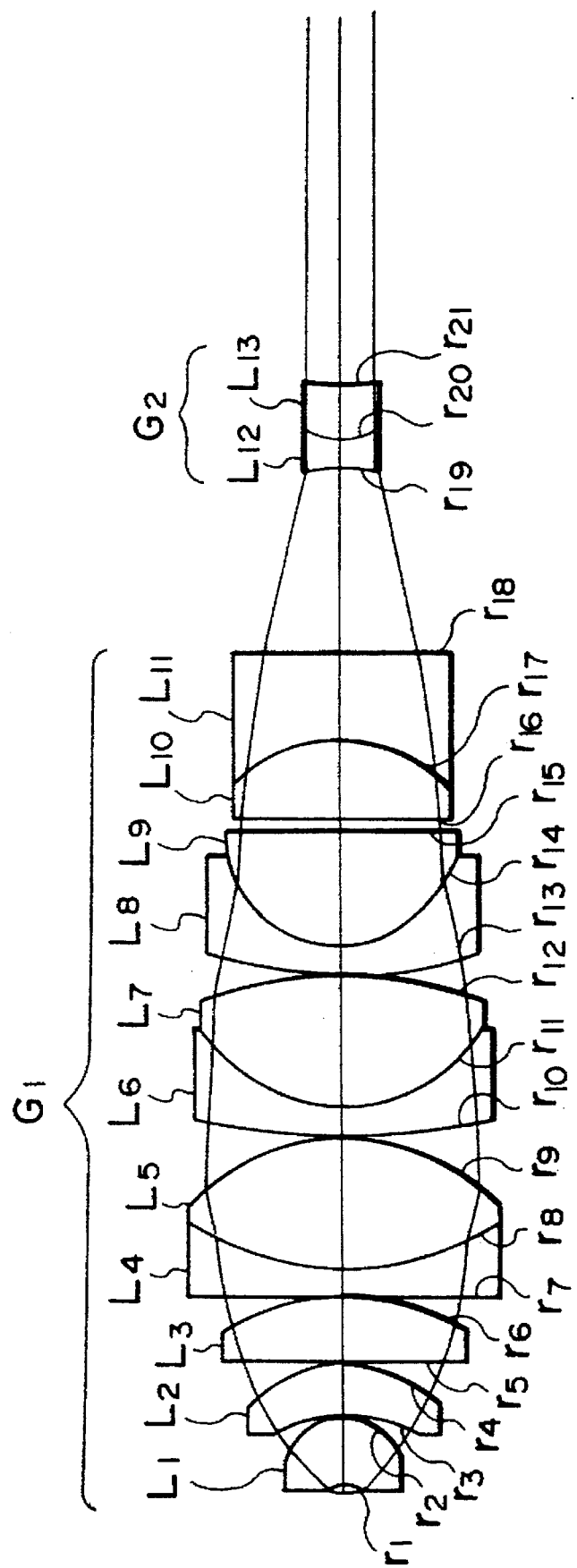

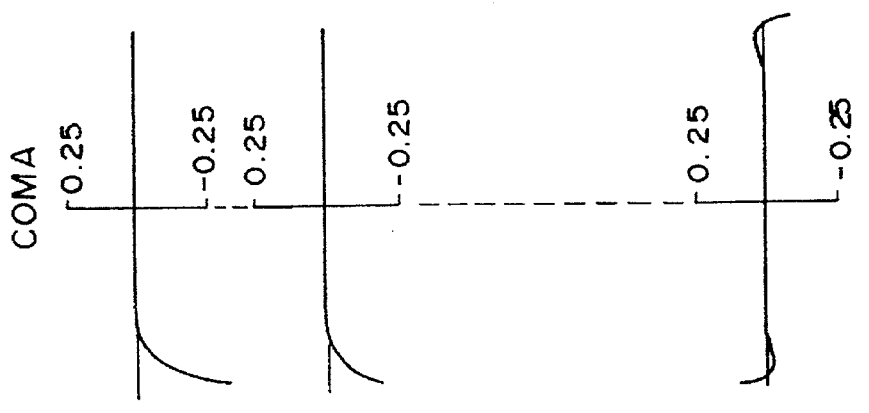
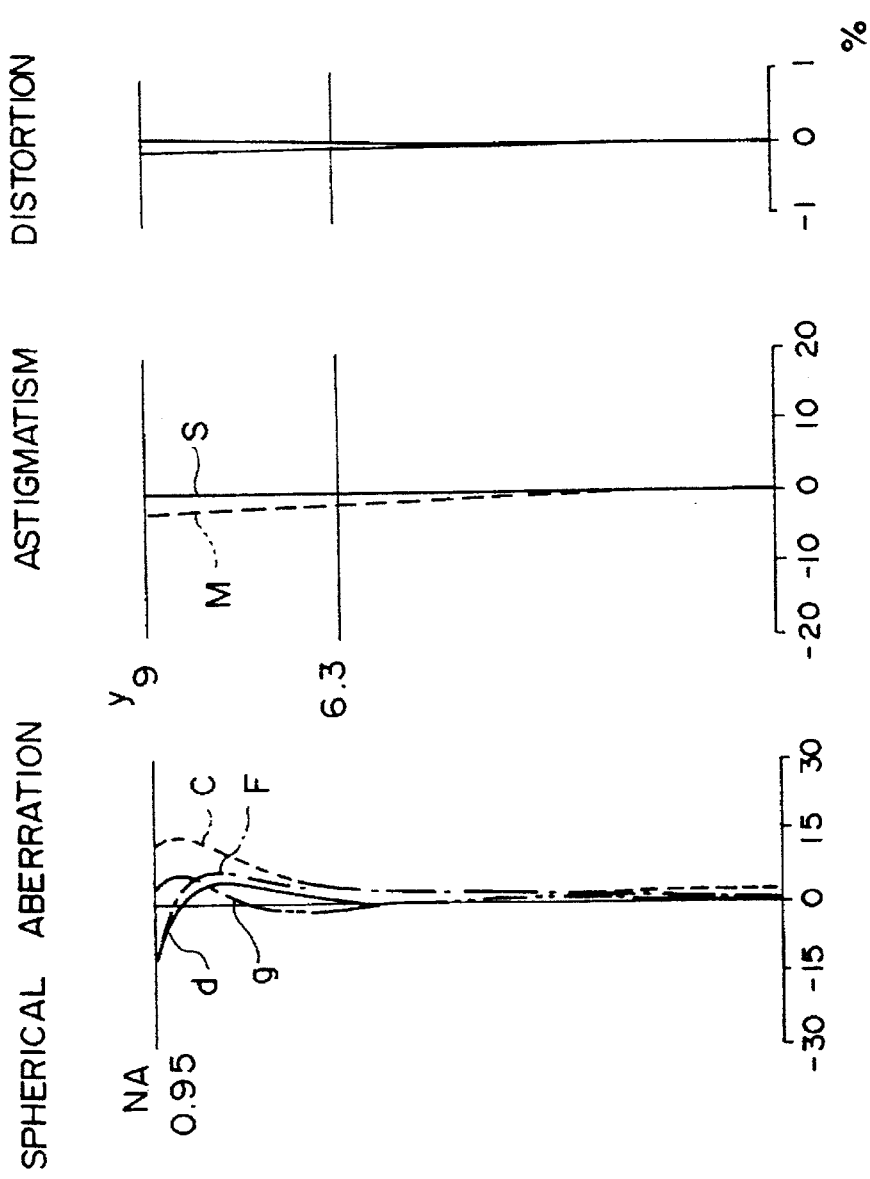

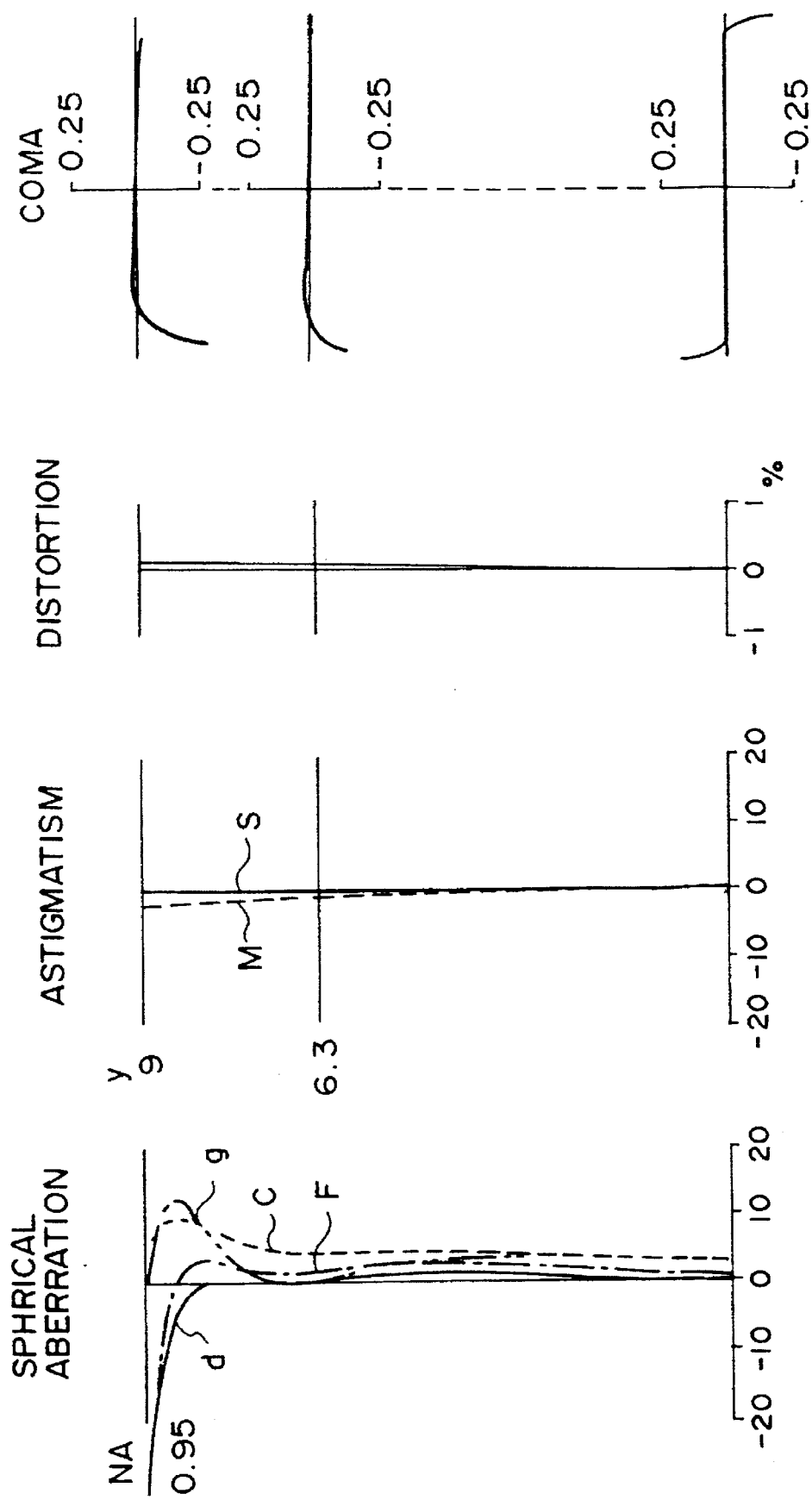

MICROSCOPE OBJECTIVE LENS AND MICROSCOPE USING THE SAME

BACKGROUND OF THE INVENTION

1. Field of the Invention

The present invention relates to a microscope objective lens and, more particularly, to a metal microscope objective lens. Furthermore, the present invention relates to a microscope using the microscope objective lens.

2. Related Background Art

A conventional dry-system microscope objective lens has a lens arrangement disclosed in, e.g., Japanese Patent Publication No. 4-26446.

More specifically, a conventional dry-system microscope objective lens has a front group $G_1$ having positive refracting power and a rear group $G_2$ having negative refracting power, as shown in FIG. 1. Furthermore, the front group $G_1$ having positive refracting power has, in the following order from the object side, a positive meniscus lens element with a concave surface facing the object side, a positive cemented lens component, and a meniscus lens component with a convex surface facing the object side. The rear group $G_2$ having negative refracting power has a cemented lens of two negative lenses and one positive lens.

As shown in FIG. 1, in the front group $G_1$, a lens nearest to the image side is a meniscus lens with a concave surface facing the object side, which is obtained by cementing a biconvex single lens and a biconcave single lens to each other. The cemented lens, nearest to the image side, in the front group $G_1$ has almost no refraction effect, as can be seen from FIG. 1.

SUMMARY OF THE INVENTION

According to the present invention, there is provided a microscope objective lens which comprises, in the following order from the object side, a front group of positive refracting power which has a positive meniscus lens element with a concave surface facing the object side, and a cemented lens component, and converts beams from an object into convergent beams, and a rear group of negative refracting power, which is disposed at the image side of the front group and has a cemented lens of a negative lens element and a positive lens element, wherein a cemented lens, nearest to the image side, out of the cemented lens component in the front group satisfies:

$$|R_1|/f > 100 \quad (1)$$

$$|R_2|/f > 20 \quad (2)$$

where $R_1$ is the radius of curvature of a lens surface, nearest to the object side, of the cemented lens, nearest to the image side, in the front group, $R_2$ is the radius of curvature of a lens surface, nearest to the image side, of the cemented lens, nearest to the image side, in the front group, and f is the focal length of the microscope objective lens.

The microscope objective lens of the present invention preferably satisfies:

$$v_{21} > 50 \quad (3)$$

$$v_{22} > 50 \quad (4)$$

where $v_{21}$ is the Abbe's number of the negative lens element in the rear group, and $v_{22}$ is the Abbe's number of the positive lens element in the rear group.

Furthermore, in order to achieve an apochromatic microscope objective lens, the positive meniscus lens component with the concave surface facing the object side in the front group has at least three positive meniscus lens elements, and at least two positive meniscus lenses of the at least three positive meniscus lenses preferably satisfy:

$$v > 90 \quad (5)$$

where $v$ is the Abbe's number of each of the at least two positive meniscus lenses.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6 is a view showing the lens arrangement of the embodiment 1.

FIGS. 7 to 10 are graphs to show various aberrations of the embodiment 1.

FIGS. 13 to 16 are graphs to show various aberrations of the embodiment 2.

DESCRIPTION OF THE PREFERRED EMBODIMENTS

In general, in a metal microscope, a microscope objective lens also serves as an illumination optical system for the microscope since an object to be examined is observed with reflected light. More specifically, in a general microscope objective lens, light rays propagate only from the object side toward the image side, while in a metal microscope objective lens, light rays propagate not only from the object side toward the image side, but also from the image side toward the object side.

Figure 1:
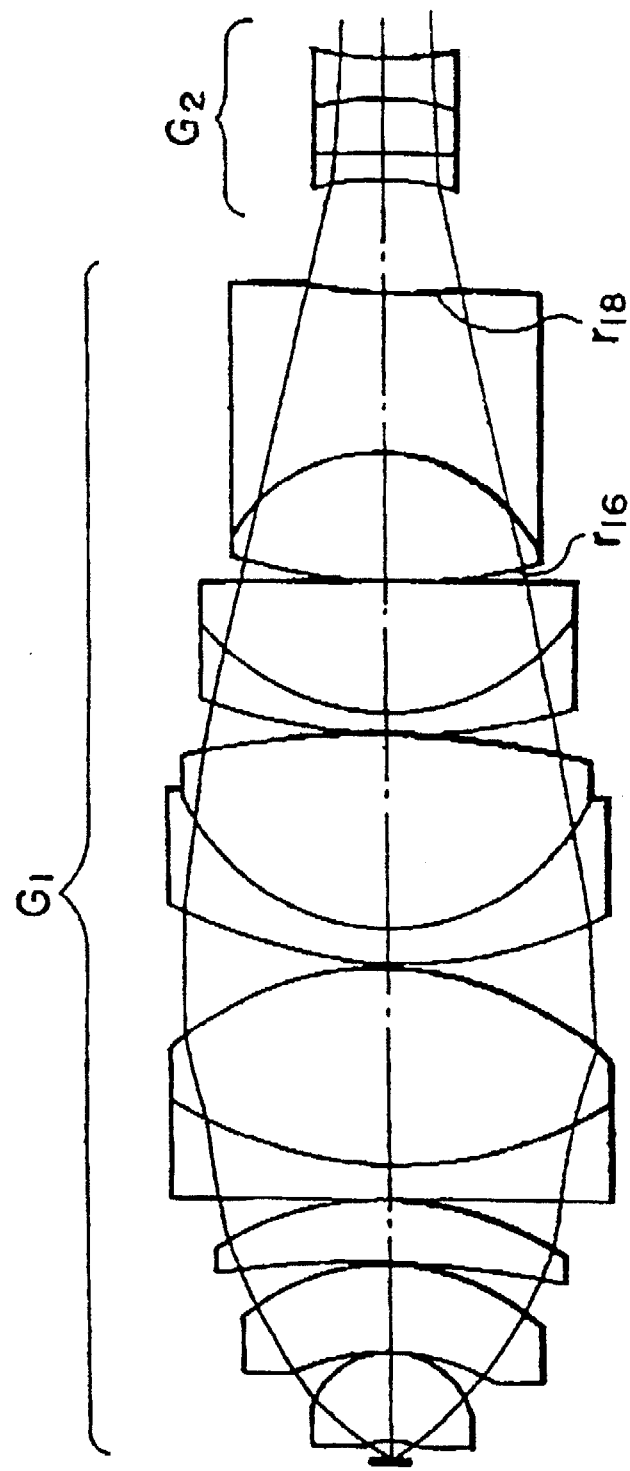
FIG. 1 is a drawing to show the conventional dry-system microscope objective lens.

The conventional dry-system microscope objective lens shown in FIG. 1 is applied to a metal microscope objective lens. When observation light from an object to be examined propagates through the conventional dry-system microscope objective lens shown in FIG. 1, no problem is posed. However, when illumination light propagates through the conventional dry-system microscope objective lens shown in FIG. 1 in a direction opposite to the observation light from the object to be examined, the illumination light is reflected by a specific surface, and flare light is generated. As a result, the contrast is lowered, resulting in difficult observation. Note that in this specification, flare light means stray light which reaches an image upon reflection by a lens surface.

In the case of the conventional dry-system microscope objective lens shown in FIG. 1, boundary surfaces $r_{16}$ and $r_{18}$ of the cemented lens, nearest to the image side, in the front group $G_1$ with the air cause harmful reflections. As described above, the cemented lens, nearest to the image side, in the front group has almost no refraction effect. For this reason, light rays, which are incident from the image side on the cemented lens, nearest to the image side, in the front group as illumination light, are reflected by a refraction surface in the same direction as the incident light rays, as can be seen from FIG. 1.

Figure 2:
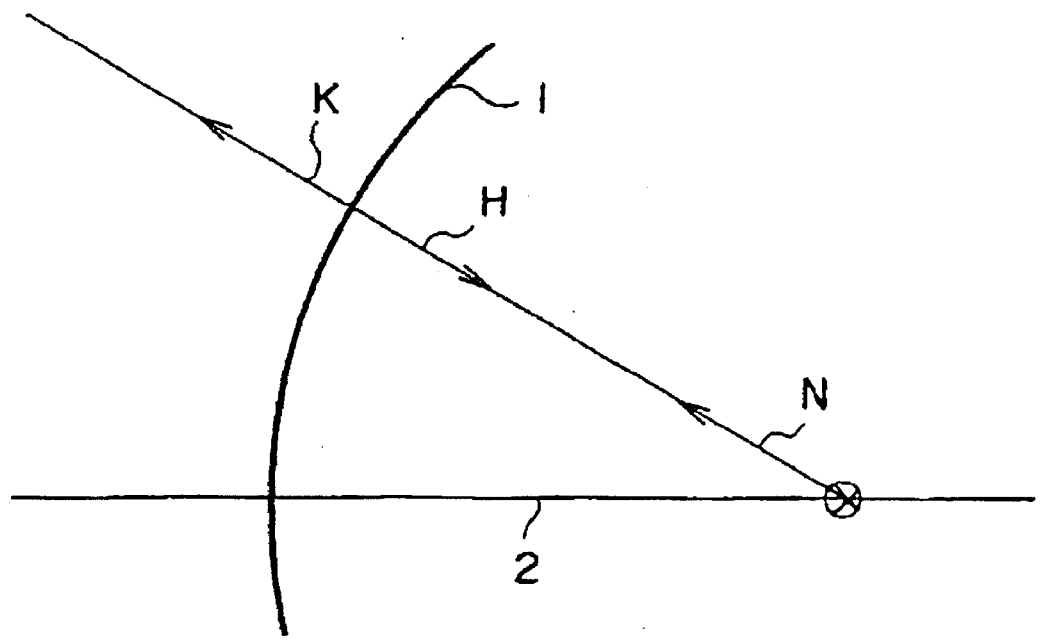
FIGS. 2 to 4 are drawings to explain the relation among a refraction surface, an incident light ray and a reflected light ray.

The above-mentioned phenomenon will be explained in detail below with reference to FIG. 2. FIG. 2 shows a case wherein the center of the curvature (indicated by a mark ○ in FIG. 2), on an optical axis 2, of a refraction surface 1 agrees with the central position (indicated by a mark x in FIG. 2), on the optical axis 2, where an incident light ray N diverges (or converges). In this case, a refracted light ray K which is incident on and refracted by the refraction surface 1 does not undergo refraction by the refraction surface 1 at all, and its state is equivalent to that of the incident light ray N which is transmitted through the refraction surface 1. Also, in this case, a reflected light ray H which is incident on and reflected by the refraction surface 1 propagates along the same optical path as the incident light ray N in a direction opposite thereto. This is because the normal to the refraction surface 1 coincides with the incident light ray N, and the incident light ray N is perpendicularly incident on the incident point on the refraction surface 1.

When the center of the curvature of the refraction surface substantially coincides with the central position where the incident light ray diverges (or converges), the central position where the reflected light ray reflected by the refraction surface converges (or diverges) also substantially coincides with the center of the curvature of the refraction surface.

In this manner, the reflected light, which is reflected in the same direction as the incident light ray, forms an image together with the observation light. The contrast of the formed image is lowered due to the presence of such flare light, resulting in very poor appearance of the image upon actual observation.

Figure 3:
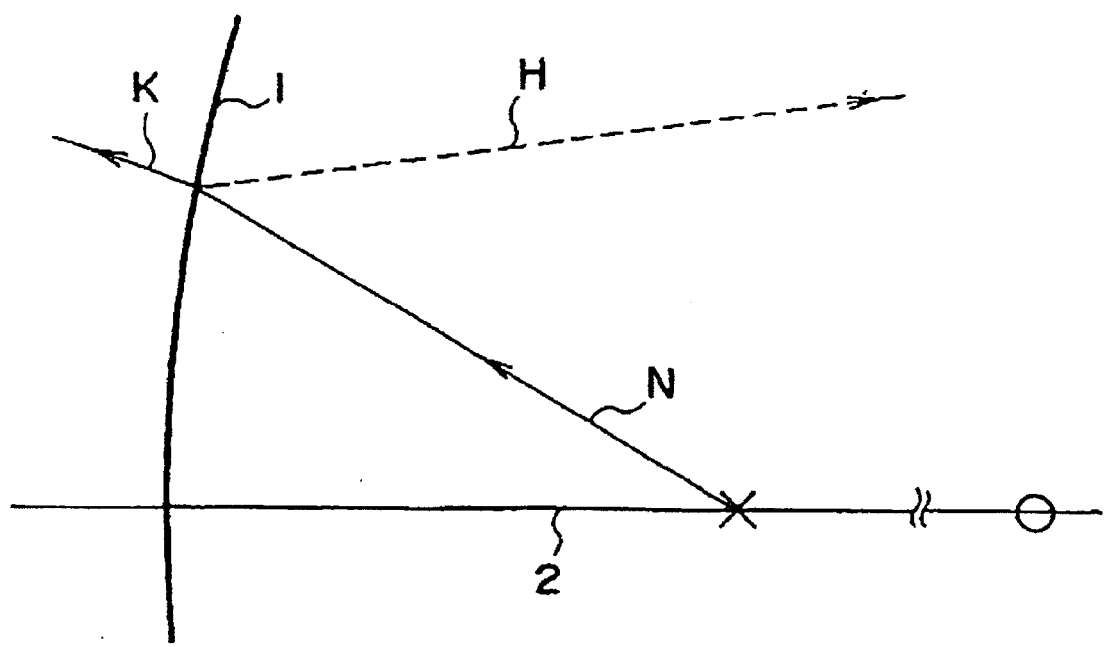

In the present invention, as shown in FIG. 3, the center of the curvature of the refraction surface does not coincide with the central position where a light ray diverges (or converges). In this manner, the present invention can eliminate flare light.

In FIG. 3, the central position (indicated by a mark x in FIG. 3), on the optical axis 2, where the light ray diverges is present between the center of the curvature (indicated by a mark ○ in FIG. 3) of the refraction surface 1, and the refraction surface 1. In this case, an incident light ray N incident on the refraction surface 1 is reflected in a direction to separate from the optical axis 2, as shown in FIG. 3. A reflected light ray H which is incident on and reflected by the refraction surface 1 finally reaches the inner wall of the lens barrel of a microscope. Note that the inner wall of the lens barrel of the microscope is painted in black or is lined with filling, and the light ray which has reached the inner wall of the lens barrel of the microscope disappears.

Conditions (1) and (2) above quantitatively define the above-mentioned requirements. If the objective lens satisfies these conditions (1) and (2), a microscope objective lens which can eliminate flare light can be realized. If conditions (1) and (2) are not satisfied, as described above, a light ray which is incident as illumination light is reflected in substantially the same direction as an incident light ray, and is combined with observation light, thus increasing flare light. When the lower limit of condition (1) is set to be 150, and the lower limit of condition (2) is set to be 25, better results are expected. Furthermore, when the lower limit of condition (1) is set to be 200, and the lower limit of condition (2) is set to be 30, very good results are expected.

Figure 4:
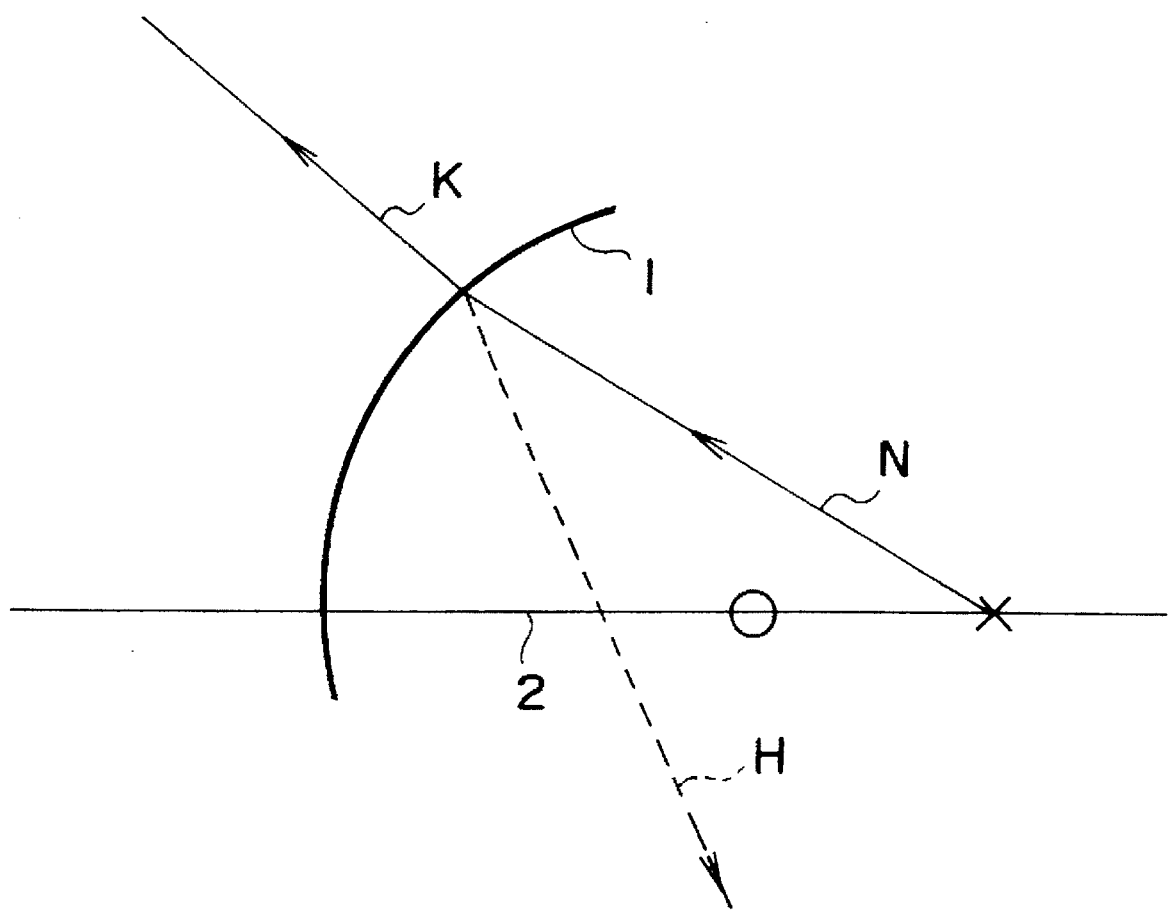

Furthermore, in the present invention, conditions (3) and (4) above are preferably satisfied. Conditions (3) and (4) are those for eliminating flare light generated at the cemented surfaces in the rear group. In the case of the conventional dry-system microscope objective lens shown in FIG. 1 as well, the rear group $G_2$ generates flare light, which is smaller than that generated by the cemented lens, nearest to the image side, in the front group $G_1$. In a method of eliminating flare light in this case, as shown in FIG. 4, in principle, the central position (indicated by a mark x in FIG. 4) where an incident light ray N diverges is located at a side opposite to the refraction surface 1 with respect to the center of the curvature of the refraction surface 1. In a case shown in FIG. 4, the incident light ray N incident on the refraction surface 1 is reflected in a direction toward the optical axis 2. The reflected light ray finally reaches the inner wall of the lens barrel of the microscope, which wall is painted in black or is lined with filling, and disappears. Thus, the amount of flare light generated at the cemented surfaces can be reduced. If conditions (3) and (4) are not satisfied, flare light increases inconveniently.

As another method of eliminating flare light generated at the cemented surfaces, a method of setting the refractive index difference before and after the cemented surface to be zero or nearly zero is available. However, when the refractive index difference is set to be zero or nearly zero, the cemented surface inconveniently loses its effect of deflecting a light ray, and the degree of freedom of aberration correction decreases by one.

Furthermore, in the present invention, condition (5) above is preferably satisfied. Condition (5) is one for achieving an apochromatic microscope objective lens with high magnification. If condition (5) is not satisfied, chromatic coma increases, and an apochromatic microscope objective lens cannot be achieved. If chromatic coma increases, an image suffers color smearing, resulting in very poor appearance of the image. In this specification, the chromatic coma means coma with respect to respective wavelengths (colors).

In the present invention, condition (6) below is preferably satisfied:

$$|R_3|/f<5 \qquad (6)$$

where $R_3$ is the radius of curvature of a cemented surface of the cemented lens, nearest to the image side, in the front group.

Condition (6) is one for satisfactorily correcting various aberrations. When the range of this condition is exceeded, especially chromatic aberration increases, and an apochromatic microscope objective lens with high magnification as the object of the present invention cannot be achieved. When the upper limit of condition (6) is set to be 4.6, a better result is expected. Furthermore, when the upper limit of condition (6) is set to be 4.2, a very good result is expected.

Figure 5:
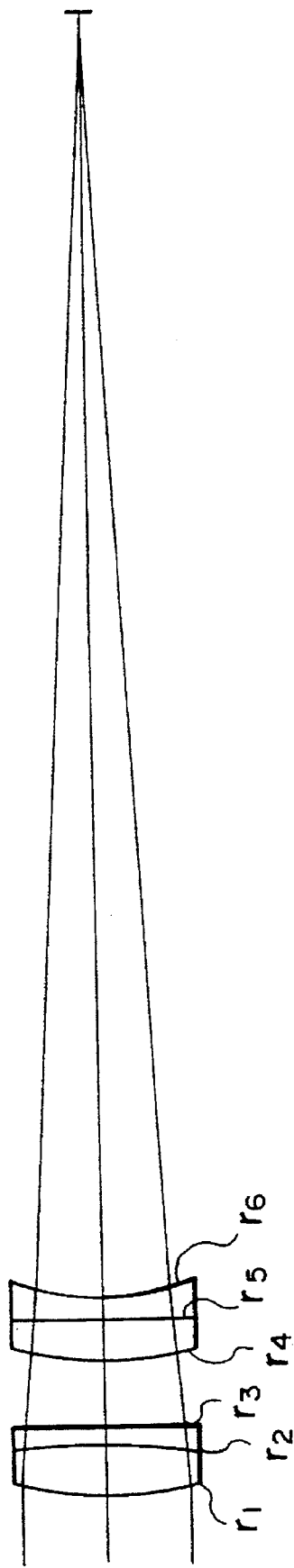
FIG. 5 is a drawing to show an imaging lens.

The embodiments of the present invention will be described hereinafter. All the embodiments are designed as infinity systems. When a microscope objective lens of each embodiment is actually used, an imaging lens shown in, e.g., FIG. 5 is disposed at the image side of the objective lens. Table 1 below summarizes data of the imaging lens shown in FIG. 5.

TABLE 1

| Surface Number No. | Radius of Curvature r | Central Thickness Interval d | Refractive Index $n_d$ | Abbe's Number $v_d$ |
| --- | --- | --- | --- | --- |
| 1 | 52.00 | 6.50 | 1.61720 | 54.0 |
| 2 | −87.00 | 2.00 | 1.74950 | 35.2 |
| 3 | 350.00 | 8.50 | | |
| 4 | 49.00 | 5.00 | 1.66755 | 42.0 |
| 5 | 0.00 | 2.50 | 1.61266 | 44.4 |
| 6 | 31.00 | 158.78 | | |

Focal Length f = 204

Tables 2 to 4 presented later summarize data of Embodiments 1 to 3. In each table, numerals in the leftmost column represent the order of lens surfaces from the object side, and $n_d$ and $v_d$ are respectively the refractive index and Abbe's number for the d-line (λ=587.6 nm). Also, W.D. represents a value corresponding to the operating distance, i.e., the distance between the object surface and the apex of the frontmost lens surface. The value of the focal length is one defined by data without using an imaging lens.

FIGS. 7 to 10, FIGS. 13 to 16, and FIGS. 19 to 22 respectively graphs showing various aberrations of the respective embodiments at the respective use magnifications when an imaging lens is also used. These graphs show spherical aberration, astigmatism, coma, and distortion for the d-line (λ=587.6 nm), and graphs showing spherical aberration also show curves for the C-line (λ=656.3 nm), the F-line (λ=486.1 nm), and the g-line (λ=435.8 nm).

Figure 11:
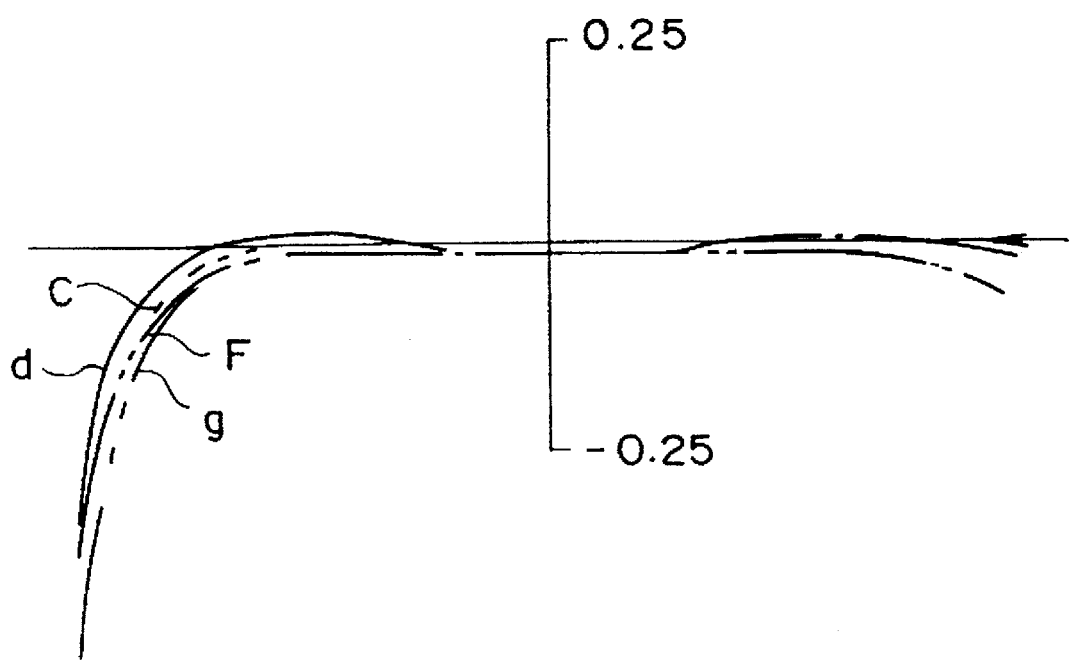
FIG. 11 is a graph to show chromatic coma at the maximum incident height in the embodiment 1.
Figure 17:
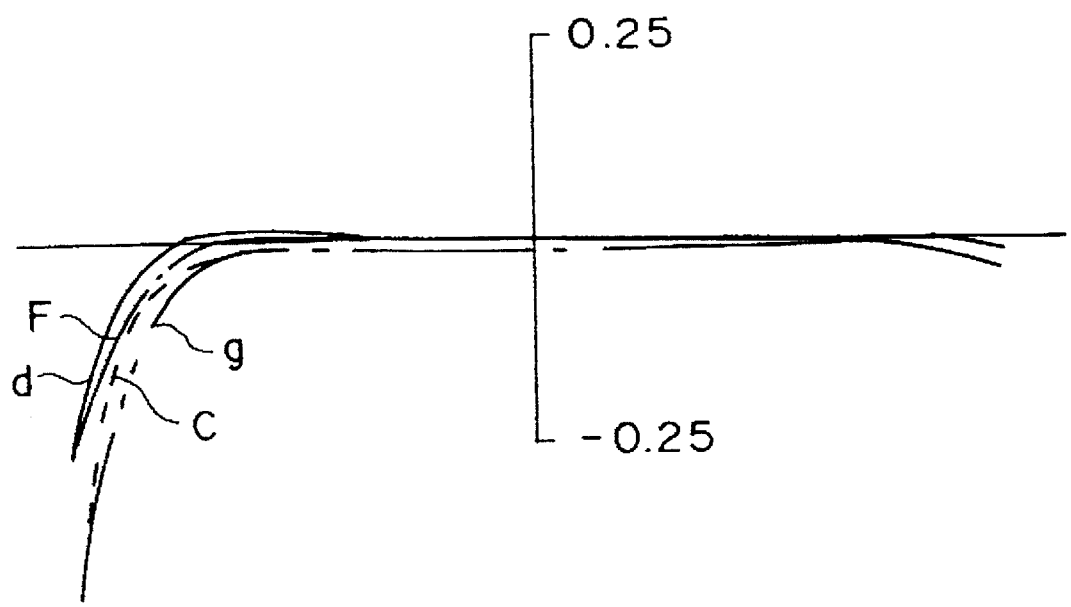
FIG. 17 is a graph to show chromatic coma at the maximum incident height in the embodiment 2.
Figure 23:
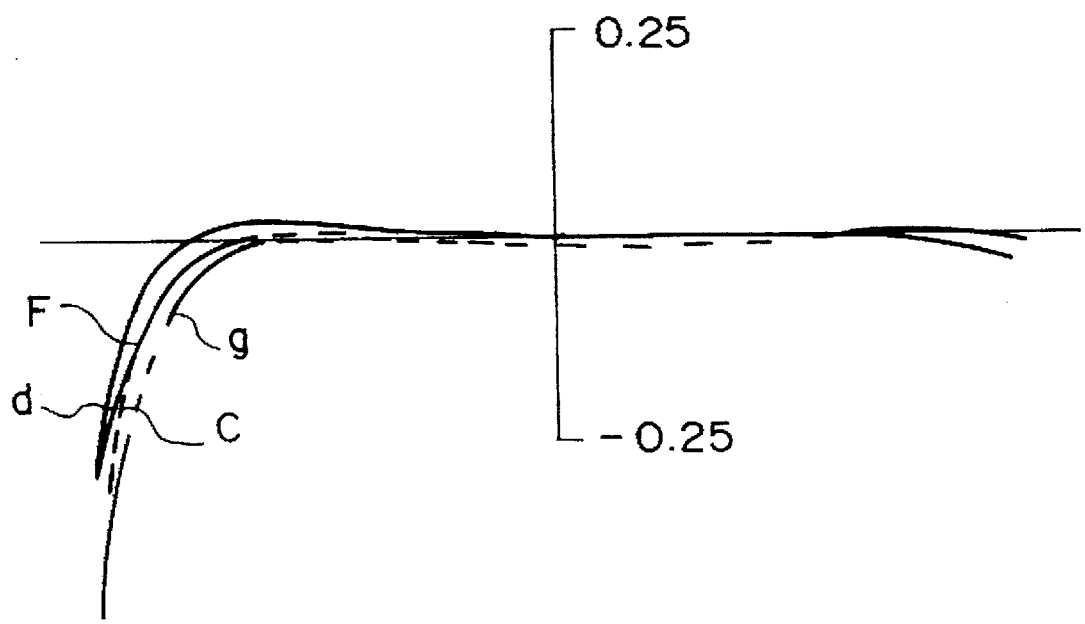
FIG. 23 is a graph to show chromatic coma at the maximum incident height in the embodiment 3.

Furthermore, FIGS. 11, 17, and 23 show chromatic coma at the maximum incident height in the respective embodiments. Each of FIGS. 11, 17, and 23 shows not only a curve for the d-line (λ=587.6 nm), but also curves for the C-line (λ=656.3 nm), the F-line (λ=486.1 nm), and the g-line (λ=435.8 nm), as in graphs showing spherical aberration.

EMBODIMENT 1

FIG. 6 is a view showing the lens arrangement of this embodiment. The lens arrangement will be described below with reference to FIG. 6.

A front group $G_1$ has, in the following order from the object side, positive meniscus lens elements: a first positive meniscus lens $L_1$ with a concave surface facing the object side, and second and third positive meniscus lenses $L_2$ and $L_3$ each with a concave surface facing the object side as positive meniscus lens elements; and cemented lens components: a first cemented lens consisting of a negative lens $L_4$ with a concave surface facing the image side and a biconvex positive lens $L_5$, a second cemented lens consisting of a negative lens $L_6$ with a concave surface facing the image side and a biconvex positive lens $L_7$, a third cemented lens consisting of a negative lens $L_8$ with a concave surface facing the object side and a biconvex positive lens $L_9$, and a fourth cemented lens consisting of a biconvex positive lens $L_{10}$ and a biconcave negative lens $L_{11}$. A rear group $G_2$ has a negative lens constituted by cementing a biconcave negative lens $L_{12}$ as a negative lens element, and a positive meniscus lens $L_{13}$ with a concave surface facing the image side as a positive lens element.

Table 2 below summarizes data of Embodiment 1. FIGS. 7 to 10 are graphs showing various aberrations of the lens of this embodiment, and FIG. 11 is a graph showing chromatic coma at the maximum incident height in this embodiment.

TABLE 2

| Surface Number No. | Radius of Curvature r | Central Thickness Interval d | Refractive Index $n_d$ | Abbe's Number $v_d$ | | |
| --- | --- | --- | --- | --- | --- | --- |
| 1 | −2.10 | 2.49 | 1.76684 | 46.8 | $L_1$ | $G_1$ |
| 2 | −2.38 | 0.05 | | | | |
| 3 | −6.92 | 2.00 | 1.43388 | 95.6 | $L_2$ | |
| 4 | −4.80 | 0.05 | | | | |
| 5 | −235.08 | 2.30 | 1.43388 | 95.6 | $L_3$ | |
| 6 | −9.86 | 0.10 | | | | |
| 7 | 704.79 | 1.00 | 1.79504 | 28.6 | $L_4$ | |
| 8 | 10.65 | 5.00 | 1.49782 | 86.5 | $L_5$ | |
| 9 | −8.06 | 0.10 | | | | |
| 10 | 26.72 | 1.10 | 1.61266 | 44.4 | $L_6$ | |
| 11 | 6.68 | 4.80 | 1.49782 | 82.5 | $L_7$ | |
| 12 | −17.50 | 0.10 | | | | |
| 13 | 16.37 | 1.10 | 1.68893 | 31.1 | $L_8$ | |
| 14 | 4.62 | 4.50 | 1.49782 | 82.5 | $L_9$ | |
| 15 | −164.01 | 0.50 | | | | |
| 16 | 874.78 | 3.00 | 1.78472 | 25.8 | $L_{10}$ | |
| 17 | −5.25 | 3.40 | 1.67025 | 57.5 | $L_{11}$ | |
| 18 | 146.43 | 7.00 | | | | |
| 19 | −4.25 | 1.00 | 1.58913 | 61.1 | $L_{12}$ | $G_2$ |
| 20 | 3.26 | 2.00 | 1.74810 | 52.3 | $L_{13}$ | |
| 21 | 10.19 | | | | | |

Focal Length f = 1.33
N.A. = 0.95
Magnification: 150
W.D. = 0.4
$R_1/f = 658$
$R_2/f = 110$
$R_3/f = -3.95$

EMBODIMENT 2

Figure 12:
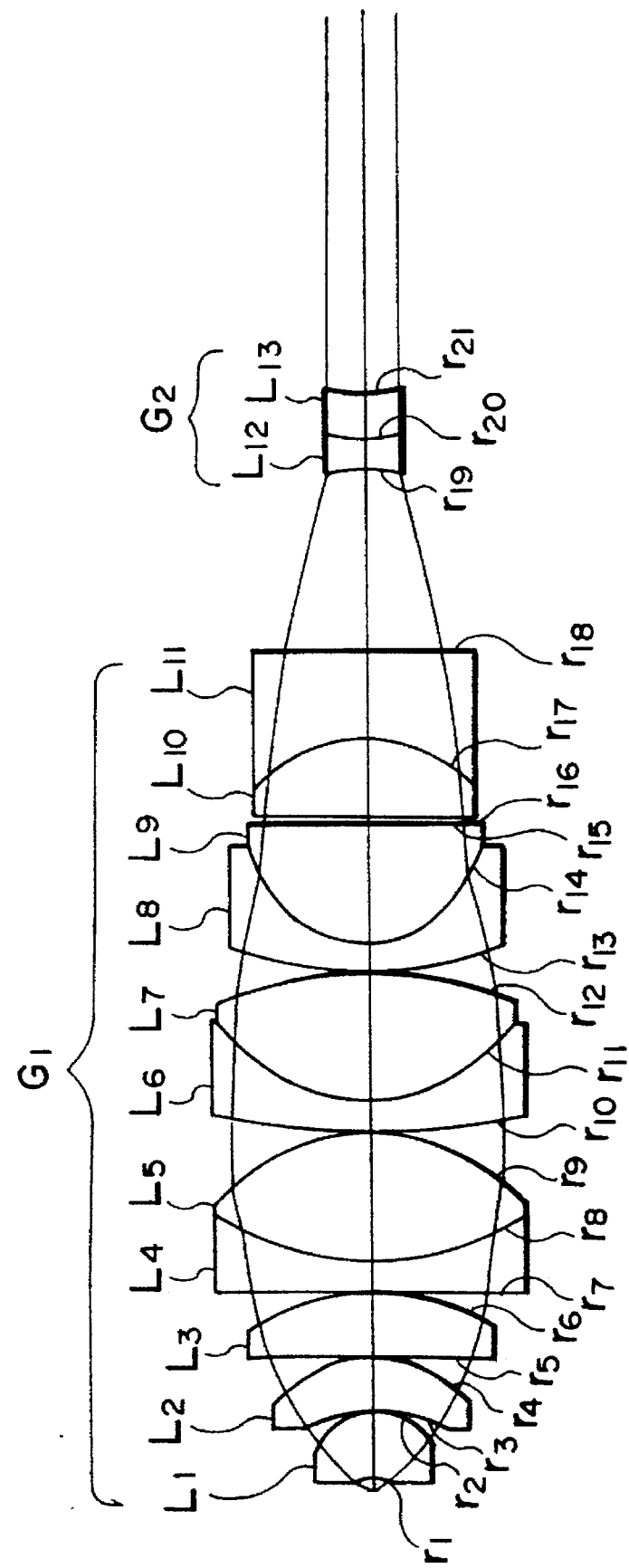
FIG. 12 is a view showing the lens arrangement of the embodiment 2.

FIG. 12 is a view showing the lens arrangement of this embodiment. The lens arrangement will be described below with reference to FIG. 12.

A front group $G_1$ has, in the following order from the object side, positive meniscus lens elements: a first positive meniscus lens $L_1$ with a concave surface facing the object side, and second and third positive meniscus lenses $L_2$ and $L_3$ each with a concave surface facing the object side as positive meniscus lens elements; and cemented lens components: a first cemented lens consisting of a biconcave negative lens $L_4$ and a biconvex positive lens $L_5$, a second cemented lens consisting of a negative meniscus lens $L_6$ with a concave surface facing the image side and a biconvex positive lens $L_7$, a third cemented lens consisting of a negative meniscus lens $L_8$ with a concave surface facing the image side and a positive meniscus lens $L_9$ with a concave surface facing the image side, and a fourth cemented lens consisting of a positive meniscus lens $L_{10}$ with a concave surface facing the object side and a biconcave negative lens $L_{11}$. A rear group $G_2$ has a negative lens constituted by cementing a biconcave negative lens $L_{12}$ as a negative lens element, and a positive meniscus lens $L_{13}$ with a concave surface facing the image side as a positive lens element.

Table 3 below summarizes data of Embodiment 2. FIGS. 13 to 16 are graphs showing various aberrations of the lens of this embodiment, and FIG. 17 is a graph showing chromatic coma at the maximum incident height in this embodiment.

TABLE 3

| Surface Number No. | Radius of Curvature r | Central Thickness Interval d | Refractive Index $n_d$ | Abbe's Number $v_d$ | | |
|---|---|---|---|---|---|---|
| 1  | −2.10   | 2.49 | 1.76684 | 46.8 | $L_1$    | $G_1$ |
| 2  | −2.38   | 0.05 |         |      |          |       |
| 3  | −7.00   | 2.00 | 1.43388 | 95.6 | $L_2$    |       |
| 4  | −4.69   | 0.05 |         |      |          |       |
| 5  | −68.57  | 2.30 | 1.43388 | 95.6 | $L_3$    |       |
| 6  | −9.34   | 0.10 |         |      |          |       |
| 7  | −336.00 | 1.00 | 1.79504 | 28.6 | $L_4$    |       |
| 8  | 10.96   | 5.00 | 1.49782 | 86.5 | $L_5$    |       |
| 9  | −8.10   | 0.10 |         |      |          |       |
| 10 | 31.86   | 1.10 | 1.61266 | 44.4 | $L_6$    |       |
| 11 | 7.06    | 4.80 | 1.49782 | 82.5 | $L_7$    |       |
| 12 | −15.56  | 0.10 |         |      |          |       |
| 13 | 13.88   | 1.10 | 1.68893 | 31.1 | $L_8$    |       |
| 14 | 4.57    | 4.50 | 1.49782 | 82.5 | $L_9$    |       |
| 15 | 85.72   | 0.50 |         |      |          |       |
| 16 | −362.00 | 3.00 | 1.78472 | 25.8 | $L_{10}$ |       |
| 17 | −5.25   | 3.40 | 1.67025 | 57.5 | $L_{11}$ |       |
| 18 | 1000.00 | 7.00 |         |      |          |       |
| 19 | −4.33   | 1.00 | 1.58913 | 61.1 | $L_{12}$ | $G_2$ |
| 20 | 3.20    | 2.00 | 1.74810 | 52.3 | $L_{13}$ |       |
| 21 | 9.68    |      |         |      |          |       |

Focal Length f = 1.33
N.A. = 0.95
Magnification: 150
W.D. = 0.4
$R_1/f = -272$
$R_2/f = 752$
$R_3/f = -3.95$

EMBODIMENT 3

Figure 18:
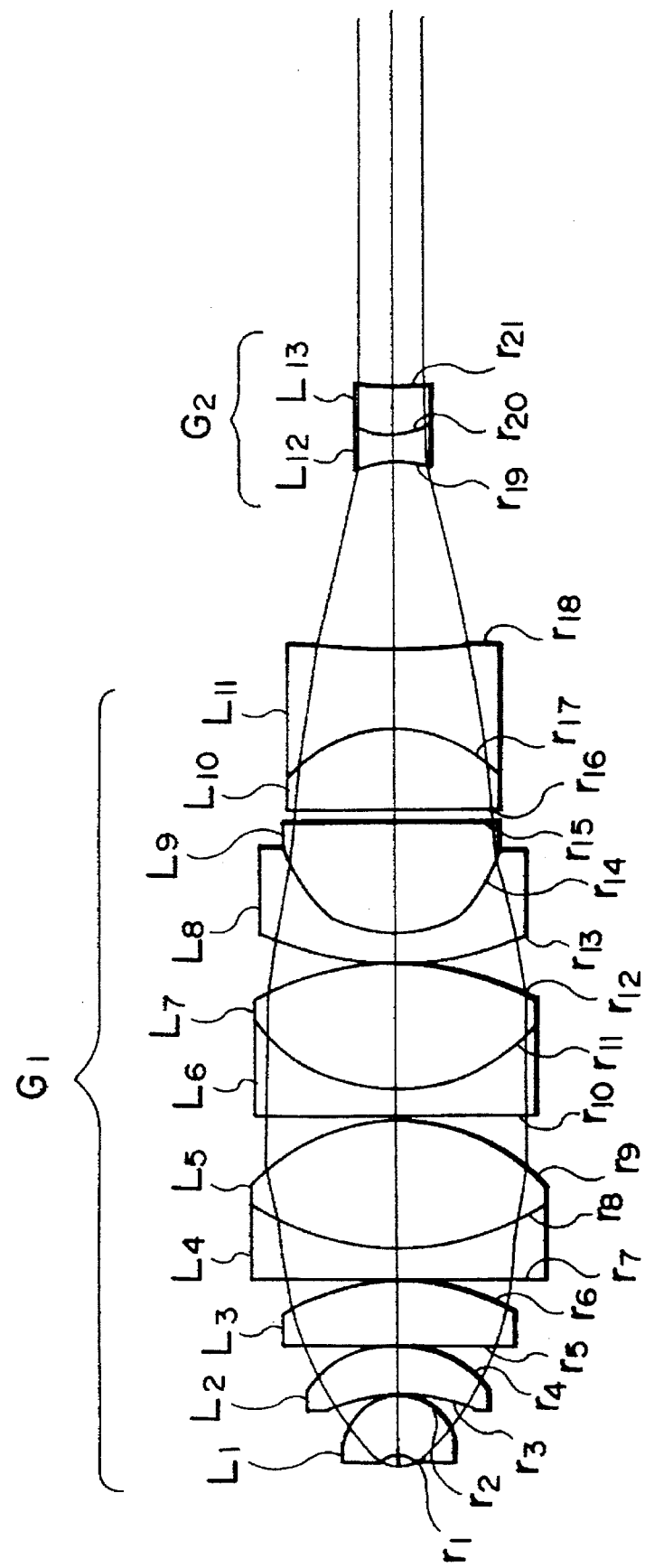
FIG. 18 is a view showing the lens arrangement of the embodiment 3.
Figures 19, 20, 21, 22:
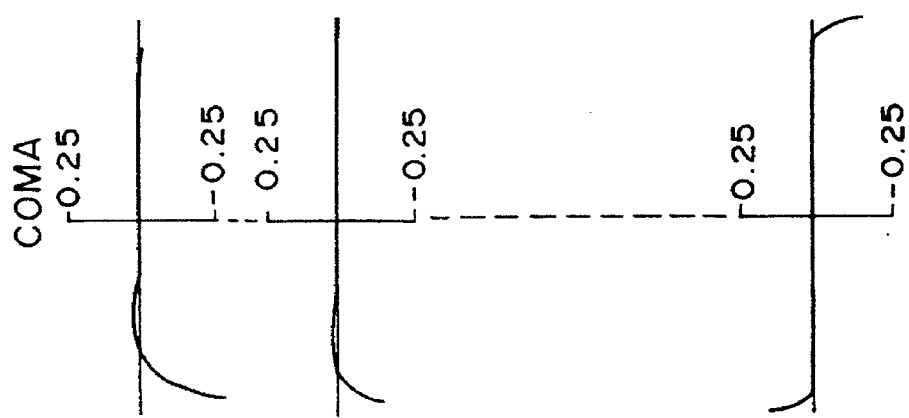
FIGS. 19 to 22 are graphs to show various aberrations of the embodiment 3.

FIG. 18 is a view showing the lens arrangement of this embodiment. The lens arrangement will be described below with reference to FIG. 18.

A front group $G_1$ has, in the following order from the object side, positive meniscus lens elements: a first positive meniscus lens $L_1$ with a concave surface facing the object side, and second and third positive meniscus lenses $L_2$ and $L_3$ each with a concave surface facing the object side as positive meniscus lens elements; and cemented lens components: a first cemented lens consisting of a biconcave negative lens $L_4$ and a biconvex positive lens $L_5$, a second cemented lens consisting of a negative lens $L_6$ with a concave surface facing the image side and a biconvex positive lens $L_7$, a third cemented lens consisting of a negative lens $L_8$ with a concave surface facing the image side and a positive meniscus lens $L_9$ with a concave surface facing the image side, and a fourth cemented lens consisting of a biconvex positive lens $L_{10}$ and a biconcave negative lens $L_{11}$. A rear group $G_2$ has a negative lens constituted by cementing a biconcave negative lens $L_{12}$ as a negative lens element, and a positive meniscus lens $L_{13}$ with a concave surface facing the image side as a positive lens element.

Table 2 below summarizes data of Embodiment 3. FIGS. 19 to 22 are graphs showing various aberrations of the lens of this embodiment, and FIG. 23 is a graph showing chromatic coma at the maximum incident height in this embodiment.

TABLE 4

| Surface Number No. | Radius of Curvature r | Central Thickness Interval d | Refractive Index $n_d$ | Abbe's Number $v_d$ | | |
|---|---|---|---|---|---|---|
| 1  | −2.10    | 2.49 | 1.76684 | 46.8 | $L_1$    | $G_1$ |
| 2  | −2.38    | 0.05 |         |      |          |       |
| 3  | −7.06    | 2.00 | 1.43388 | 95.6 | $L_2$    |       |
| 4  | −4.71    | 0.05 |         |      |          |       |
| 5  | −86.06   | 2.30 | 1.43388 | 95.6 | $L_3$    |       |
| 6  | −9.25    | 0.10 |         |      |          |       |
| 7  | −300.34  | 1.00 | 1.79504 | 28.6 | $L_4$    |       |
| 8  | 10.80    | 5.00 | 1.49782 | 86.5 | $L_5$    |       |
| 9  | −8.11    | 0.10 |         |      |          |       |
| 10 | 53.77    | 1.10 | 1.61266 | 44.4 | $L_6$    |       |
| 11 | 7.39     | 4.80 | 1.49782 | 82.5 | $L_7$    |       |
| 12 | −14.73   | 0.10 |         |      |          |       |
| 13 | 12.94    | 1.10 | 1.68893 | 31.1 | $L_8$    |       |
| 14 | 4.68     | 4.50 | 1.49782 | 82.5 | $L_9$    |       |
| 15 | 3165.50  | 0.50 |         |      |          |       |
| 16 | 773.81   | 3.00 | 1.78472 | 25.8 | $L_{10}$ |       |
| 17 | −5.40    | 3.40 | 1.67025 | 57.5 | $L_{11}$ |       |
| 18 | 50.00    | 7.00 |         |      |          |       |
| 19 | −4.23    | 1.00 | 1.58913 | 61.1 | $L_{12}$ | $G_2$ |
| 20 | 3.31     | 2.00 | 1.74810 | 52.3 | $L_{13}$ |       |
| 21 | 10.64    |      |         |      |          |       |

Focal Length f = 1.33
N.A. = 0.95
Magnification: 150
W.D. = 0.4
$R_1/f = 582$
$R_2/f = 38$
$R_3/f = -4.06$ Furthermore, Table 5 below summarizes the flare coefficients of the respective embodiments. The flare coefficient is defined by (the amount of light which is reflected by a given surface whose reflectance is assumed to be 100%, and reaches a detection system)/(the amount of light incident on the surface). Note that the product of the flare coefficient and the reflectance of the surface corresponds to the actual flare amount.

TABLE 5

|          | Embodiment 1 | Embodiment 2 | Embodiment 3 |
|----------|--------------|--------------|--------------|
| $r_{16}$ | 0.005 | 0.005 | 0.005 |
| $r_{18}$ | 0.005 | 0.005 | 0.009 |
| $r_{19}$ | 0.001 | 0.001 | 0.001 |
| $r_{20}$ | 0.001 | 0.001 | 0.001 |
| $r_{21}$ | 0.069 | 0.061 | 0.069 |
| Total    | 0.153 | 0.141 | 0.157 |

As can be seen from Table 5, the objective lenses of Embodiments 1 to 3 generate very small flare light.

As can be seen from FIGS. 7 to 10, FIGS. 13 to 16, and FIGS. 19 to 22, respective aberrations are satisfactorily corrected. In particular, on-axis chromatic aberration is corrected very satisfactorily.

Furthermore, as can be seen from the chromatic coma states in the respective embodiments shown in FIGS. 11, 17, and 23, chromatic coma is corrected very satisfactorily.

As described above, according to the embodiments described above, an apochromatic objective lens with high magnification free from flare light can be realized.

Note that the present invention is not limited to the above-mentioned embodiments. In each of the above embodiments, an infinity-system objective lens has been exemplified. However, by slightly modifying the rear group $G_2$, a finite-system objective lens can be easily realized. Needless to say, a microscope objective lens according to the present invention can be used not only in a metal microscope but also generally in a dry-system microscope.

Figure 24:
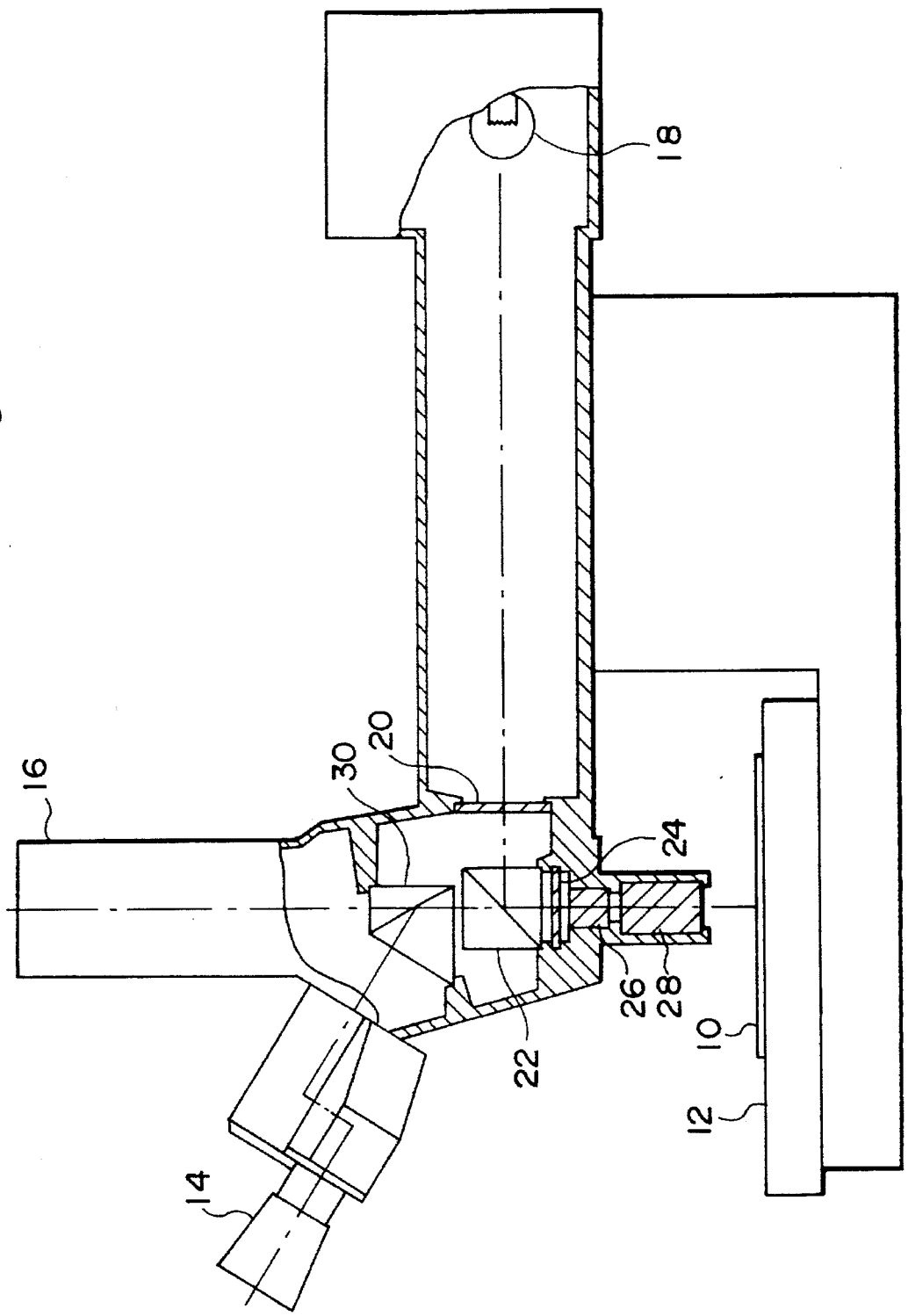
FIG. 24 is a sectional view to show an example of a metal microscope using the objective lens shown in FIG. 6.

FIG. 24 is a sectional view showing an example of a metal microscope using the objective lens shown in FIG. 6. Referring to FIG. 24, an object 10 to be observed such as a wafer is placed on a stage 12, and it can be observed via an eyepiece lens 14 or photographed by a camera attached to a camera attachment portion 16. The object 10 to be observed is supported by the stage 12 to be movable in two directions perpendicular to the optical axis indicated by an alternate long and short dash line, and in a direction parallel to the optical axis. The arrangement of the metal microscope will be described below.

A halogen lamp 18 emits a light beam for illuminating the object 10 to be observed, and illumination light is polarized by a polarization filter 20. The optical path of the illumination light which is converted into predetermined polarized light via the polarization filter 20 is deflected through 90° by a polarization beam splitter 22. The illumination light is transmitted through a quarter-wave plate 24, is transmitted through an imaging lens 26 shown in FIG. 5, and is then transmitted through an objective lens 28 shown in FIG. 6. The illumination light emerging from the objective lens 28 illuminates the surface of the object 10 to be observed. Observation light reflected by the surface of the object 10 to be observed is transmitted through the objective lens 28, the imaging lens 26, and the quarter-wave plate 24 in a direction opposite to that described above. Since this light beam is transmitted through the quarter-wave plate 24 twice, it is transmitted through the polarization beam splitter 22 this time. The observation light transmitted through the polarization beam splitter 22 is split into two light beams by a prism 30 having a semi-transparent reflection film. One light beam reaches the eyepiece lens 14, and the other light beam reaches the camera attachment portion 16. Since the prism 30 is constituted by combining two prisms, the optical path of the observation light which propagates toward the camera attachment portion 16 is not deflected by the prism 30.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A microscope objective lens comprising:

a front group having positive refracting power to convert a beam from an object into a convergent beam, and having a positive meniscus lens element with a concave surface facing the object side, and a plurality of cemented lens components disposed at the image side of said positive meniscus lens; and a rear group having negative refracting power, having a negative lens element and a positive lens element which is cemented with said negative lens element, and disposed at the image side of said front group, wherein said cemented lens component disposed nearest to the image side in said front group satisfies:

$|R_1|/f > 100$ $|R_2|/f > 20$ where $R_1$ is a radius of curvature of a lens surface on the object side of said last cemented lens component, $R_2$ is a radius of curvature of a lens surface on the image side of said last cemented lens component, and
f is a focal length of said microscope objective lens.

2. A microscope objective lens according to claim 1, wherein said microscope objective lens satisfies:

$v_{21} > 50$ $v_{22} > 50$ where $v_{21}$ is an Abbe's number of said negative lens element in said rear group, and $v_{22}$ is an Abbe's number of said positive lens element in said rear group.

3. A microscope objective lens according to claim 1, wherein said positive meniscus lens element with the concave surface facing the object side in said front group comprises at least three positive meniscus lenses, and at least two positive meniscus lenses of said at least three positive meniscus lenses satisfy:

$v > 90$ where $v$ is an Abbe's number of each of said at least two positive meniscus lenses.

4. A microscope objective lens according to claim 2, wherein said positive meniscus lens element with the concave surface facing the object side in said front group comprises at least three positive meniscus lenses, and at least two positive meniscus lenses of said at least three positive meniscus lenses satisfy:

$v > 90$ where $v$ is an Abbe's number of each of said at least two positive meniscus lenses.

5. A microscope objective lens according to claim 1, wherein said objective lens is used with an imaging lens, disposed at the image side of said objective lens, for focusing a beam emerging from said rear group.

6. A microscope comprising:

a stage for supporting an object to be observed;

a light source system for supplying illumination light for illuminating the object to be observed supported by said stage;

light guide means for deflecting an optical path of the illumination light emitted from said light source system in a direction of the object to be observed; and a microscope objective lens for guiding the illumination light from said light guide means toward the object to be observed, and acting on light reflected by the object to be observed, wherein said light guide means guides light reflected by the object to be observed and transmitted through said microscope objective lens in a direction different from the direction of said light source system, and said microscope objective lens comprises:

a front group having positive refracting power to convert a beam from the object to be observed into a convergent beam, and having a positive meniscus lens element with a concave surface facing the object to be observed, and a plurality of cemented lens components disposed at the image side of said positive meniscus lens; and a rear group having negative refracting power, having a negative lens element and a positive lens element which is cemented with said negative lens element, and disposed at the image side of said front group, in which said cemented lens component disposed nearest to the image side in said front group satisfies:

$|R_1|/f > 100$ $|R_2|/f > 20$ where $R_1$ is a radius of curvature of a lens surface on the side of the object to be observed of said last cemented lens component, $R_2$ is a radius of curvature of a lens surface on the image side of said last cemented lens component, and f is a focal length of said microscope objective lens.

7. A microscope according to claim 6, further comprising an imaging lens for focusing a beam emerging from said rear group.

8. A microscope according to claim 6, further comprising:

a polarization filter disposed between said light source system and said light guide means; and a quarter-wave plate disposed between said light guide means and said microscope objective lens, and wherein said light guide means comprises a polarization beam splitter.

9. A microscope according to claim 6, further comprising an eyepiece lens for receiving light reflected by the object to be observed and transmitted through said microscope objective lens and said light guide means.

10. A microscope according to claim 6, further comprising a camera attachment portion to which a camera for photographing the object to be observed based on light reflected by the object to be observed and transmitted through said microscope objective lens and said light guide means is attached.

* * * * *